United States Patent [19]
Gray et al.

[11] 3,949,941
[45] Apr. 13, 1976

[54] THERMOPLASTIC WASTE CONVERTER

[76] Inventors: Bob P. Gray; James A. Gray, both of 503 Summit Ave., Gainesville, Tex. 76240

[22] Filed: Apr. 9, 1975

[21] Appl. No.: 566,174

Related U.S. Application Data

[63] Continuation-in-part of Ser. No. 414,742, Nov. 12, 1973, Pat. No. 3,897,011.

[52] U.S. Cl. ................................. 241/41; 241/15
[51] Int. Cl.² ...................................... B02C 11/08
[58] Field of Search ............ 241/41, 15, 17, 18, 38, 241/58

[56] References Cited
UNITED STATES PATENTS

| | | | |
|---|---|---|---|
| 3,510,067 | 5/1970 | Beck et al. | 241/17 |
| 3,717,307 | 2/1973 | Beck | 241/15 X |

*Primary Examiner*—Roy Lake
*Assistant Examiner*—DeWalden W. Jones
*Attorney, Agent, or Firm*—Pravel & Wilson

[57] ABSTRACT

An apparatus for converting thermoplastic waste material into a commercial-grade granular material wherein the waste material is introduced into a chamber containing a rotating cutter which shreds and frictionally heats the thermoplastic material which is thereafter cooled by cooling water added to the material while the cutting operation continues. The cooling water or vapor is then withdrawn or exhausted from the container under negative pressure leaving the granular material dry. Also, solvents are removed from the material. The cutter blade may include baffle bars which provide frictional heating surfaces for heating the thermoplastic waste material.

1 Claim, 5 Drawing Figures

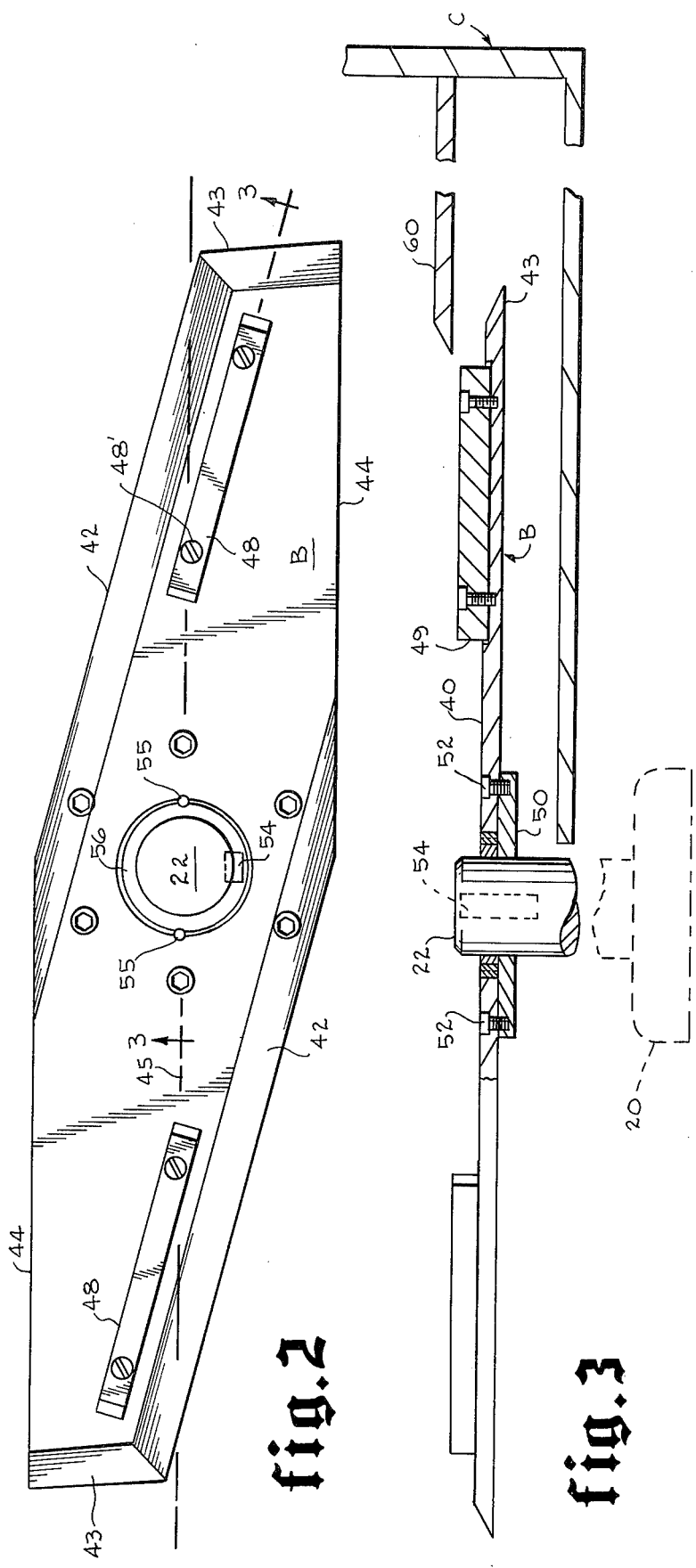

THERMOPLASTIC WASTE CONVERTER

CROSS REFERENCES TO RELATED APPLICATIONS

This application is a continuation-in-part of our U.S. patent application, Ser. No. 414,742, filed Nov. 12, 1973, co-pending herewith, now U.S. Pat. No. 3,897,011.

BACKGROUND OF THE INVENTION

1. Field of the Invention:

An apparatus for converting film from thermoplastic or fiber waste material such as polypropylene into commercial-grade granular material by shredding and heating the waste material in a container and thereafter cooling the heated material to form it into granules.

2. Description of the Prior Art:

The prior art includes devices such as that of Beck, et al., U.S. Letters Pat. No. 3,685,748, which provides a means for pulverizing and densifying thermoplastic waste into granular form. However, such prior art devices do not process low-density waste plastic material fast enough to be commercially desirable and also do not generate sufficient heat to satisfactorily process high-density thermoplastic waste material.

SUMMARY OF THE INVENTION

The present invention provides a new and improved apparatus for processing waste thermoplastic material to convert it into commercially usable granules. In one embodiment of the apparatus of the present invention, the rotating cutter or blade is provided with baffle bars which frictionally heat the batch of thermoplastic material to facilitate converting it to a granular form. Further, the present invention is provided with a water or moisture removal apparatus which effectively separates the cooling water from the batch after it has been cooled and which also removes solvents from the processed material.

BRIEF DESCRIPTION OF THE DRAWINGS

FIG. 2 is a top view illustrating the cutter blade used in the apparatus of the present invention;

FIG. 3 is a side view, partly in section, illustrating additional details of the cutter blade;

FIG. 5 is a top view illustrating baffle bars employed with the cutter blade according to one embodiment of the present invention.

DESCRIPTION OF THE PREFERRED EMBODIMENT

Figure 1:
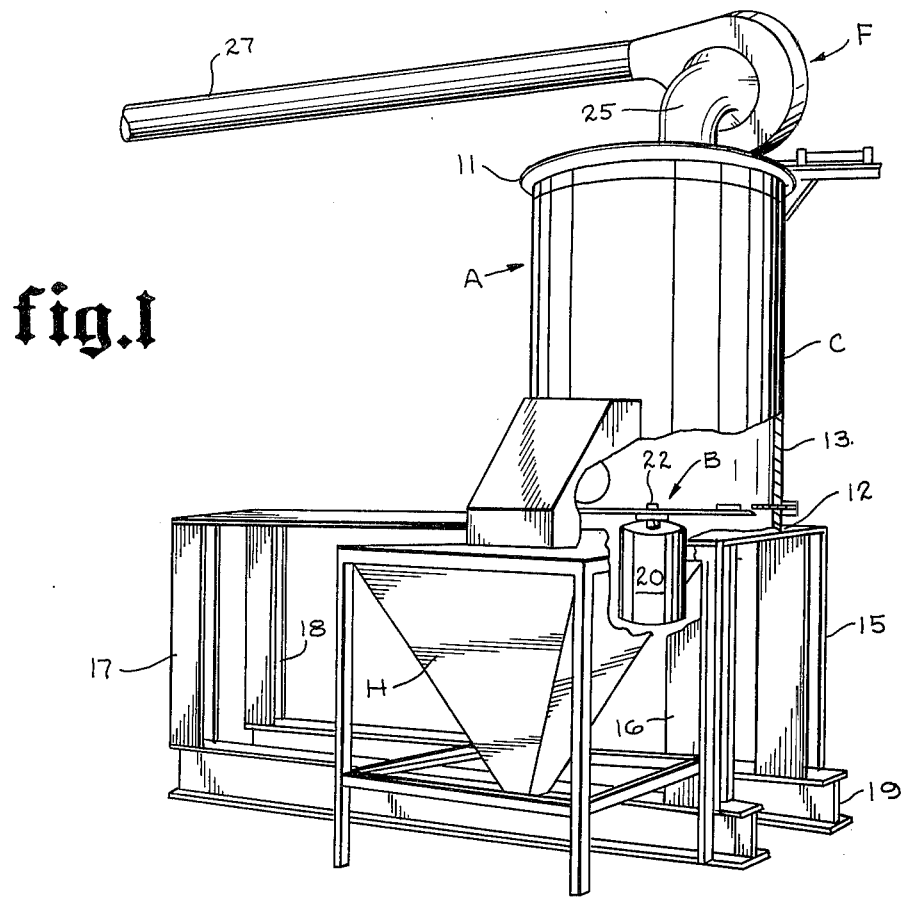
FIG. 1 is an isometric view partly in section which illustrates the apparatus of the present invention for converting thermoplastic waste material into granular particles.

The apparatus of the present invention is designated generally A in FIG. 1 of the drawings. Such apparatus A includes a cylindrical drum C for receiving a charge of the material to be processed and has a rotating blade or cutter B disposed near the bottom of such drum. A moisture-removable blower or exhaust fan F is provided for removing moisture from the container C as will be described in detail hereinafter. The drum or container C is connected via a chute to a hopper H which receives the material after it has been processed in the drum C. With the apparatus of this present invention, a batch or charge of approximately one hundred pounds of scrap thermoplastic polyethylene material is placed in the container C through a suitable opening (not shown) which is preferably positioned adjacent the top of the container C. With this apparatus, a batch of waste film thermoplastic polyethylene is shredded into small strips by high speed (approximately 1800 r.p.m.) rotation of the cutter blade B adjacent the bottom of the drum or cylindrical container C and thereafter continued rotation of such blade B frictionally heats the material and thereby causes it to form into particles which are then cooled by injecting water into the container with continued rotation of the blades. Next, cooling water and vapor is removed from the container through the exhaust fan or blower F and the pulverized granular material suitably dried and then discharged from the container into the hopper H. Also, solvents from any ink released during processing of the waste thermoplastic material are removed by the exhaust blower F.

With the apparatus of the present invention, approximately one hundred pounds of waste thermoplastic material can be shredded, heated and cooled to form granular material having a density of 23 to 25 pounds per cubic foot, which is particularly desirable for commercial application. Also, the apparatus of the present invention is suitable for processing high-density as well as low-density thermoplastic material.

Considering the apparatus of the present invention in more detail, the cylindrical container C is formed of suitable material such as steel with a top 11, a bottom 12, and a side wall 13. The bottom 12 rests on suitable supports 15, 16, 17 and 18, respectively, which support the drum or container C in an elevated position above the floor. Also, as shown in FIG. 1 of the drawings, a pair of horizontally extending beams or runners 19 may be provided which rest on the floor (not shown).

A drive motor 20 is supported beneath the bottom 12 with its shaft 22 projecting upwardly through such bottom for connecting the blade B which is driven by the shaft 22. The motor 20 is preferably an electrical motor, although other motor devices may be used if desired for rotating or driving the blade B.

The top 11 is provided with a suitable opening 21 through which passes a suitable discharge pipe 25 that is connected to the exhaust blower fan F for exhausting moisture and vapor from inside of the cylindrical container C. The exhaust fan F is connected to a discharge tube 27 which normally extends through the wall of a building for discharging the moisture-laden air withdrawn from the chamber or container C to the atmosphere.

Figure 4:
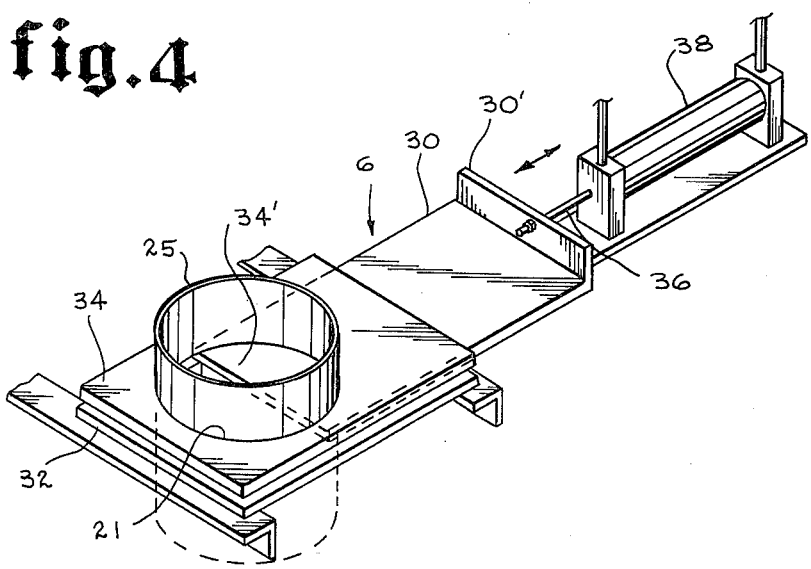
FIG. 4 is a partial top view illustrating details of the automatic gate for controlling removal of moisture and solvents from the container in which the batch is converted.

As best seen in FIG. 4 of the drawings, a sliding gate designated generally G is provided for opening and closing the discharge conduit 25. Such gate includes a horizontally extending gate member 30 which slides between a pair of vertically spaced plates 32 and 34 which are positioned adjacent the upper surface of the top 11. The upper plate 34 is provided with a suitable opening 34' which corresponds with the opening or passage through the discharge conduit 25. The gate 30 is provided with an up-turned flange member 30' which is connected to a piston rod 36 of an air or hydraulic cylinder 38 for moving the gate G laterally with respect to the discharge conduit 25. As shown in FIG. 4 of the drawings, the gate 30 is withdrawn or partially open so as to permit partial communication through the conduit 25 and the passage 34'. However, it will be appreciated that in normal operation, the gate 30 will be either fully opened or fully closed.

The container C is also provided with a lower discharge conduit for discharging the granular particles of thermoplastic material upon the completion of each cycle in the process. Such discharge conduit discharges the material into the hopper H which may then be used to bag the material for shipment.

The cutting blade B is shown in more detail in FIGS. 2 and 3 of the drawings wherein such blade comprises a single plate member 40 which is adapted to be rotated in a counterclockwise direction as seen in FIG. 2 of the drawings. Upon rotation in such counterclockwise direction, the blade B is found to have a pair of tapered leading edges 42 and inclined tapered ends 43. Such inclined tapered ends 43 are inclined a small amount, approximately 5°, from a line perpendicular to the rear or trailing edge on each end of the blade B. Such trailing edge 44 is generally parallel to the centerline 45 of the blade B. Also as shown in FIGS. 2 and 3 of the drawings, a pair of baffle bars 48 are secured to the plate 40.

Such baffle bars are preferably set in suitable longitudinally extending slots or recesses 49 formed or milled in the upper surface of the blade or plate 40. The baffle bars 48 which are provided for frictionally engaging the waste material as the blade B is rotated in the cylinder C to frictionally heat to such material. It has been found that the baffle bars 48 add significantly to the frictional heating effect on the thermoplastic material. As shown in FIG. 3 of the drawings, the baffle bars 48 are secured to the blade plate 40 by screws or bolts 48' and are replaceable so that different size bars may be used for different types of thermoplastic material, as desired.

As shown in FIGS. 2 and 3 of the drawings, the blade B is secured to a hub 50 by means of a plurality of screws 52 that are countersunk with their heads recessed so as not to project above the top of the plate 40. As shown, the heads of screws 52 are recessed below the upper surface of the blade 40. The hub 50 is keyed to the shaft 22 by the key 54 and a plurality of shear pins 55 are provided between the hub 56 and the blade 40. In the event the screws 52 work loose, the shear pins will shear so the shaft will not continue to rotate the blade.

With the apparatus of this invention, waste thermoplastic material which can be either low-density or high-density polyethylene can be processed. The low density material has a melting point of approximately 250°F and the high-density material has a melting point of approximately 275° to 285°F. The fast-melt, low-heat material may be run without the baffle bars, however, the high-density PE is generally run with the larger baffle bars so as to provide additional friction.

Alternative baffle bars 62 are illustrated in FIG. 5. The baffle bars 62 preferably extend in a direction substantially parallel to the leading cutting edges 42. The baffle blades 62 preferably extend outwardly to a position indicated generally by numeral 63, a position adjacent the outer cutting edges 43 of blade B. The blades extend inwardly toward shaft 22 and may even extend slightly beyond the shaft 22 as illustrated in FIG. 5. Arcuate recesses 64 are formed in the baffle blades 62 to facilitate mounting of the baffle blades on the upper surface of blade B and around shaft 22. Preferably, the baffle blades 62 extend inwardly at least to a position adjacent shaft 22. With this extension, capitation which may be present with the use of shorter baffle blades is eliminated. Additionally, the greater extension of the blades provides more frictional engagement with the waste thermal plastic material, and, therefore, reduces the batch processing time for the apparatus A.

After charging the container C with the scrap material to be run, the blade B is rotated so as to cut and heat the scrap material. Thereafter, water is added to cool the material and then the gate 30 is opened so as to expose the interior of the container C to a back pressure created by the exhaust fan F to remove the moisture from the container C. After the granular material has thus been dried, it is removed into the hopper H for storage and/or bagging.

Also, it has been found that with the method and apparatus of the present invention, sufficient solvents are removed from printed material so that its subsequent use does not require a vented extruder.

It has been found in using the apparatus of the present invention to process the waste thermoplastic the following steps or sequence may be beneficially employed. It will be understood that the times and measurements which are set forth herein are approximations and substantial conformity thereto will produce the desired results.

First, the container C is loaded with thermoplastic material. In a period of approximately 20 seconds about thirty pounds of material is inserted into the machine. This is done with the machine running, and therefore, the blade immediately begins cutting the material. An ammeter is provided with the machine and connected in the circuit which supplies current to operate the electric motor to drive the blade, and by observing the ammeter, it will be seen that the ammeter runs up during the loading process and draws approximately 180 amps for the 150 horsepower electric motor used in the preferred embodiment of this invention. After a period of approximately 5 seconds, the balance of the load which will be another 70 to 80 pounds is added to the machine, which requires approximately an additional minute during which time the blade will be cutting the additional waste material into shredded pieces.

For a period of 45 seconds after the total load has been placed in the machine, the blade continues to run and heats the material which by this time has been substantially shredded. This is indicated by a drop in the ammeter reading which occurs during the cooking cycle and the ammeter drops to approximately 140 amps where it generally remains throughout the cooking cycle, which is a term designating this 45 second period following the completion of placing the full load in the machine. Approximately half-way through this cooking cycle of 45 seconds, a small amount of water, say 16 ounces, is sprayed into the container in which the material is being processed. Thereafter, an additional quart of water is added at the end of the cooking cycle and, after approximately five seconds following the addition of that quart of water, an additional spray is injected into the batch to cool and coagulate the thermoplastic material. The additional spray may be as much as sixteen to 32 ounces of water. At this time, the exhaust blower is employed to remove moisture from the thermoplastic material in the tub or container C. The negative pressure created by the exhaust is imposed on the contents of the drum for approximately 30 seconds or until all the moisture has been cleared. Thereafter, the dry granulated material is dumped from the container C into the hopper H or other suitable container, which requires approximately 15 seconds, after which time the discharge door is closed and the cycle is repeated.

Also, in the preferred embodiment of this invention, it has been found that it is advantageous to position the blade B approximately 1-¾ inches above the bottom of the container C with the ends 43 of the rotatable blade 40 spaced below the plurality of laterally extending fixed blades 60 which are spaced circumferentially around the container C and which project radially inwardly. The inner ends 61 of the blades 60 extend inwardly so as to overlap the ends 43 as shown in FIG. 3.

The foregoing disclosure and description of the invention are illustrative and explanatory thereof, and various changes in the size, shape and materials as well as in the details of the illustrated construction may be made without departing from the spirit of the invention.

We claim:

1. In an apparatus for converting thermoplastic foil material into granulated thermoplastic, including:
    a. a cylindrical container having a top and a bottom;
    b. motor means mounted below said bottom for rotating a shaft extending through said bottom and disposed substantially axially of said cylindrical container;
    c. a plurality of circumferentially spaced fixed blades mounted at the wall of said cylinder and projecting radially inwardly and above the bottom of said cylinder, the improvement comprising:
    a rotatable blade member mounted on the shaft of said motor and extending diametrically of said cylinder below said fixed blades, said rotatable blade member having sharpened leading cutting edges on opposite sides of said shaft for cutting thermoplastic material in said cylinder and said sharpened leading edge being inclined with respect to the center line of said blade member; said rotatable blade also having a sharpened cutting edge extending along each end of said blade member and tapered outwardly and rearwardly of said leading cutting edge; and said rotatable blade further having a plurality of bars mounted on an upper surface of said blade member, each of said bars extending from a position adjacent an end of said blade member to a position adjacent said shaft.

* * * * *